United States Patent
Matus et al.

(10) Patent No.: US 7,022,935 B1
(45) Date of Patent: Apr. 4, 2006

(54) PLASMA-CUTTING TORCH WITH INTEGRATED HIGH FREQUENCY STARTER

(75) Inventors: Tim A. Matus, San Antonio, TX (US); Troy A. Sommerfeld, Neenah, WI (US); Joseph C. Schneider, Menasha, WI (US); James F. Ulrich, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/707,352

(22) Filed: Dec. 8, 2003

(51) Int. Cl.
*B23K 16/00* (2006.01)

(52) U.S. Cl. .......................... 219/121.39; 219/121.44; 219/121.54; 219/121.57

(58) Field of Classification Search .......... 219/121.54, 219/121.57, 121.56, 121.48, 121.39, 121.44, 219/121.45, 121.36, 74, 75, 137.31, 137.9, 219/137.7
See application file for complete search history.

(56) References Cited

U.S. PATENT DOCUMENTS

| | | | |
|---|---|---|---|
| 3,242,305 A | 3/1966 | Kane et al. | |
| 3,637,974 A * | 1/1972 | Tajbl et al. | 219/130.4 |
| 3,662,147 A * | 5/1972 | Ogden et al. | 219/137.71 |
| 4,225,769 A * | 9/1980 | Wilkins | 219/130.4 |
| 4,767,908 A | 8/1988 | Dallavalle et al. | |
| 4,791,268 A | 12/1988 | Sanders et al. | |
| 4,896,016 A * | 1/1990 | Broberg et al. | 219/121.5 |
| 4,987,285 A | 1/1991 | Dallavalle et al. | |
| 4,996,407 A | 2/1991 | Traxler | |
| 5,036,176 A | 7/1991 | Yamaguchi et al. | |
| 5,039,837 A | 8/1991 | Nourbakhsh et al. | |
| 5,070,227 A | 12/1991 | Luo et al. | |
| 5,166,494 A | 11/1992 | Luo et al. | |
| 5,170,030 A | 12/1992 | Solley et al. | |
| 5,170,033 A | 12/1992 | Couch, Jr. et al. | |
| 5,235,162 A | 8/1993 | Nourbakhsh | |
| 5,296,665 A | 3/1994 | Peterson et al. | |
| 5,310,988 A | 5/1994 | Couch, Jr. et al. | |
| 5,317,126 A | 5/1994 | Couch, Jr. et al. | |
| 5,416,297 A | 5/1995 | Luo et al. | |
| 5,530,220 A | 6/1996 | Tatham | |
| 5,597,497 A * | 1/1997 | Dean et al. | 219/121.48 |
| 5,620,617 A | 4/1997 | Borowy et al. | |
| 5,681,489 A * | 10/1997 | Carkhuff | 219/121.48 |
| 5,796,067 A | 8/1998 | Enyedy et al. | |
| 5,866,869 A | 2/1999 | Schneider et al. | |
| 5,886,315 A | 3/1999 | Lu et al. | |
| 5,938,949 A | 8/1999 | Enyedy et al. | |
| 5,961,855 A | 10/1999 | Hewett et al. | |
| 5,994,663 A | 11/1999 | Lu | |
| 6,133,543 A | 10/2000 | Borowy et al. | |
| 6,274,841 B1 | 8/2001 | Ramakrishnan et al. | |
| 6,326,581 B1 | 12/2001 | Laimer et al. | |

(Continued)

OTHER PUBLICATIONS

Hackl, Heinrich, Digitally Controlled GMA Power Sources, pp. 1-7 http://www.fronius.com/worldwide/usa/products/paper_digitally_controlled_power_sources_gb.pdf.

*Primary Examiner*—Mark Paschall
(74) *Attorney, Agent, or Firm*—Ziolkowski Patent Solutions Group, SC

(57) ABSTRACT

The present invention is directed to a system including a plasma cutting torch having an output electrode and a plasma cutter starting circuit configured to generate a pilot arc at the output electrode.

20 Claims, 3 Drawing Sheets

U.S. PATENT DOCUMENTS

| | | |
|---|---|---|
| 6,346,685 B1 | 2/2002 | Severance, Jr. et al. |
| RE37,608 E | 3/2002 | Solley et al. |
| 6,498,317 B1 | 12/2002 | Hardwick |
| 6,570,132 B1 | 5/2003 | Brunner et al. |
| 6,614,001 B1 | 9/2003 | Hackett et al. |
| 6,700,091 B1 * | 3/2004 | Jones et al. ............ 219/121.48 |

* cited by examiner

PLASMA-CUTTING TORCH WITH INTEGRATED HIGH FREQUENCY STARTER

BACKGROUND OF INVENTION

The present invention relates generally to plasma cutting systems and, more particularly, to a system for plasma cutting wherein a high-frequency starting circuit is integrated within a plasma-cutting torch. As such, the amount of high frequency, high voltage power necessary for starting the plasma cutter is reduced and the amount of wires and circuitry exposed to the power source is reduced. Furthermore, the plasma-cutting torch may be retrofitted to power sources regardless of a startup configuration for which the power source was designed.

Plasma cutting is a process in which an electric arc is used to cut a workpiece. Plasma cutters typically include a power source, a gas supply, and a torch. The torch or plasma torch is used to create and maintain the arc and plasma that perform the cutting. The plasma cutting power source receives an input voltage from a transmission power line or generator and provides an output voltage to a pair of output terminals, one of which is connected to an electrode and the other of which is connected to the workpiece.

The air supply is used with most plasma cutters to help start the arc, provide the plasma gas to the torch, and cool the torch. A movable or fixed electrode serves as a cathode and a fixed nozzle serves an anode. The air supply moves the electrode and as the electrode moves away from the nozzle, it opens the nozzle, and a plasma jet is created. The plasma jet causes the arc to transfer to the work piece, and thus initiates the cutting process. In other plasma cutting systems, a high frequency starter is used to initiate the cutting process.

Most plasma cutting systems implement one of two methods of initiating the plasma cutting arc: high frequency (HF) starting and the above-described contact starting. Contact start torches use a moving electrode or nozzle to create an initial spark to ionize the cutting gas and generate a pilot arc. A contact start torch begins with the electrode and nozzle in contact causing a short circuit, until the gas reaches the short, which blows the electrodes and/or nozzle apart to create a spark across the newly formed gap. The spark ionizes the gas thereby enabling current to flow across the newly formed gap between the nozzle and the electrode and create a pilot arc. While contact starting is a common method of initiating a plasma cutting process, it does present drawbacks. Specifically, the moving electrode and/or nozzle are particularly susceptible to wear. Furthermore, the designs are quite complex and are susceptible to misassembly, misalignment, or breakdown of the moving parts.

In contrast, HF starting is a method of generating a pilot arc without moving parts or the wear associated with shorting and breaking the nozzle and electrode. To perform HF starting, a plasma torch is connected to a power source having an HF starting circuit. The circuit typically includes a high-voltage transformer, capacitors for power conditioning, and a gap assembly to generate a high-voltage spark at the torch electrode. When sufficient power is transferred from the power source to the torch, a spark fires from the electrode and ionizes gas between the electrode and nozzle. This ionization enables current to flow across the air gap between the nozzle and the electrode. The result is a pilot arc to initiate cutting.

HF starting generally requires a voltage on the order of 3.5 kV to 5 kV to generate the ionizing spark. As such, the high-voltage transformer and coupling coil required to operate at such a voltage are relatively large, which can add to the size of the plasma-cutting system making portability cumbersome.

The high voltage must also be translated a considerable distance from the power source to the torch. It is not uncommon for distance between the power source and torch to reach distances of over fifty feet, resulting in significant losses. This problem is compounded as the distance from the power source to the torch varies as the cord connecting the two components is moved and stretched. Furthermore, extended lengths of the power cord or cable may be susceptible to relatively harsh working conditions that may negatively affect the HF power being transferred to the torch. For example, plasma cutters are commonly operated within large manufacturing environments or at an in-field site. Adding to these typically callous operating environments, the HF starting circuits typically generate a considerable amount of electrical noise. Such noise can be particularly undesirable in sensitive manufacturing processes where electrical interference can impact the operability of the manufacturing process.

Additionally, HF starting systems are mutually exclusive from contact starting systems. That is, because both the power source and the torch must be specifically tailored to the starting method, contact and HF starting power sources and torches may not be interchanged without modifications.

It would therefore be desirable to design a plasma cutting system that is capable of generating a pilot arc while reducing the aforementioned drawbacks of traditional contact and HF starting circuits. Specifically, it would be desirable to design a plasma cutting system with a HF starting circuit with reduced voltage requirements. Additionally, it would be desirable for the system to be able to be retrofitted to existing plasma cutting systems regardless of whether the system is designed for contact or HF starting.

BRIEF DESCRIPTION OF INVENTION

The present invention is directed to a system for plasma cutting that overcomes the aforementioned drawbacks. Specifically, the present invention provides a system of HF starting a plasma cutting process with reduced voltage requirements. Additionally, the present invention reduces component interdependency and may be integrated with existing plasma cutting systems.

Therefore, in accordance with one aspect of the present invention, a plasma cutting torch includes a torch body, an output electrode disposed in the torch body and a plasma cutter starting circuit disposed in the torch body and configured to generate a pilot arc at the output electrode.

In accordance with another aspect of the present invention, a manufacturing kit is disclosed that includes a plasma cutting torch configured to operatively engage a power source and a pilot arc starting circuit configured to supply the plasma cutting torch with a pilot arc independent of a starting configuration of the power source.

In accordance with another aspect of the present invention, a plasma cutting assembly is disclosed that includes a power source, a plasma cutting torch, and a starter circuit disposed within the plasma cutting torch and configured to supply the plasma cutting torch with a pilot arc independent of a starting mechanism of the power source.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a system for starting a plasma cutting process. Specifically, the present invention provides a system of HF starting a plasma cutting process with reduced voltage requirements. Additionally, the present invention reduces component interdependency and may be retrofitted to power sources configured for contact stating plasma cutters.

Figure 1:
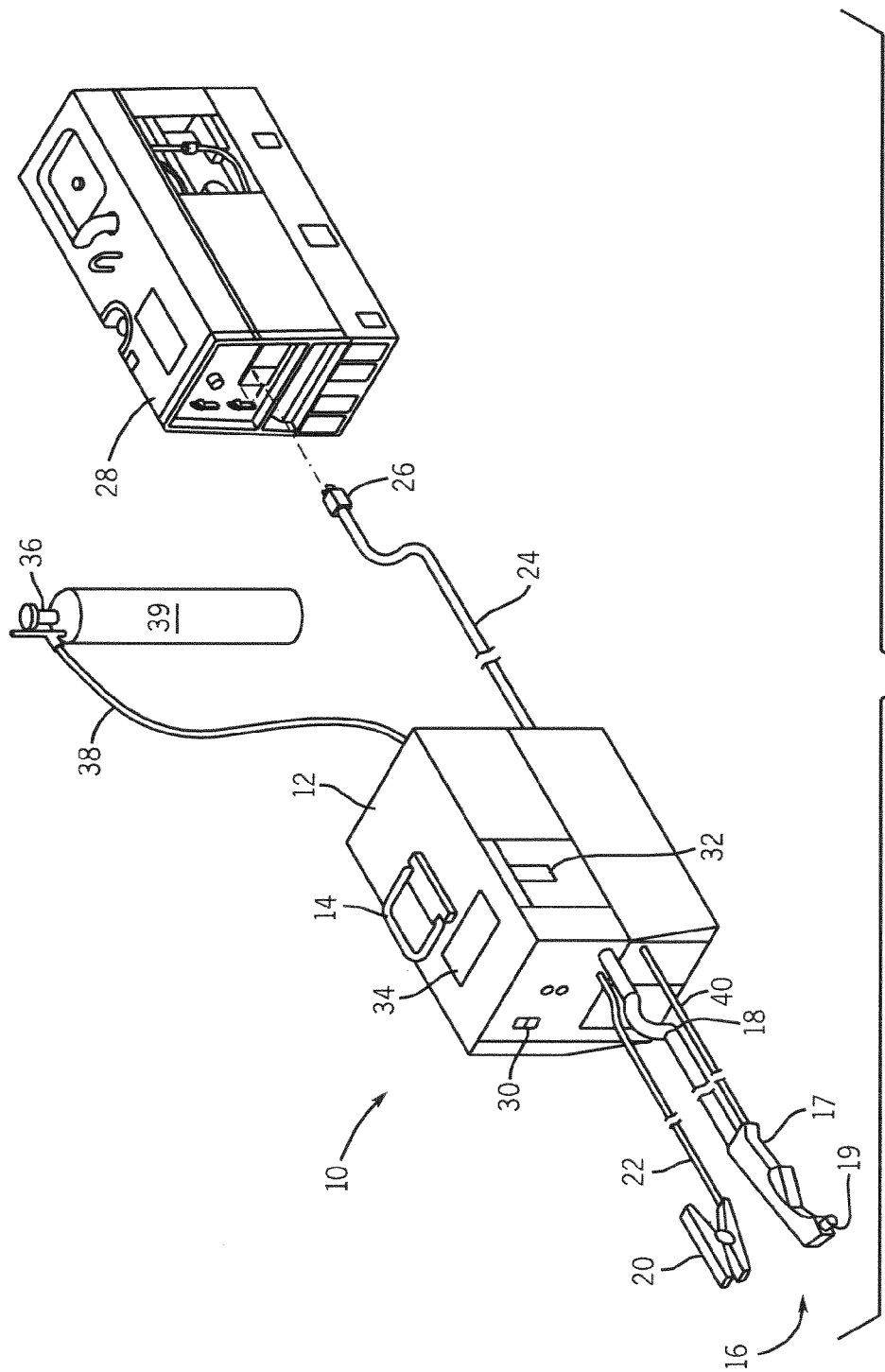
FIG. 1 is a perspective view of a plasma cutting system incorporating the present invention.

Referring to FIG. 1, a plasma cutting system 10 is shown. The plasma cutting system is a high voltage system with maximum open circuit output voltages ranging from approximately 230 Volts Direct Current (VDC) to over 300 VDC. The plasma cutting system 10 includes a power source 12 to condition raw power and regulate/control the cutting process. Specifically, the power source includes a processor that, as will be described, receives operational feedback and controls the plasma cutting system 10 accordingly. Power source 12 includes a lifting means, such as a handle 14 which effectuates transportation from one site to another. Connected to the power source 12 is a torch 16 via cable 18. The torch 16 is defined at least by a torch body or housing 17 enclosing a plasma-cutting electrode encompassed in a consumable assembly 19. Typically, the consumable assembly 19 has an insert formed therein that exhibits preferable electrical properties. That is, the insert is preferably formed of hafnium or zirconium. The cable 18 provides the torch 16 with power and serves as a communications link between the torch 16 and power source 12. The cable 18 contains two conductive paths. One conductive communications link or conductive path is dedicated to the transfer of power to energize the plasma-cutting electrode and the other conductive path is dedicated to the transfer of feedback to the power source 12. In an alternative embodiment, the cable 18 contains one conductive path between the torch 16 and power source 12 to transfer both operational feedback and power. Specifically, a single conductive path is contained within the cable 18 that simultaneously transfers power and feedback from the plasma torch regarding the plasma cutting process.

Also connected to power source 12 is a work clamp 20 which is designed to complete the circuit for a workpiece (not shown) to be cut. Connecting work clamp 20 to the power source 12 is a cable 22 designed to provide a return path for the cutting current from the torch through the workpiece and the work clamp 20. Extending from a rear portion of power source 12 is power cable 24 having plug 26 for connecting the power source 12 to a portable power supply 28 or a transmission power receptacle (not shown). Power source 12 further includes an ON/OFF switch 30.

To effectuate cutting of a workpiece, torch 16 is placed in close proximity to a workpiece connected to clamp 20. A user may then activate a trigger lock (not shown), in response to which a feedback signal is sent from a trigger sensor disposed within the torch 16 and connected to the trigger lock in the torch 16, via cord 18. Upon reaching the power source 12, the feedback is processed by a processor disposed within the power source. Upon pressing the trigger switch, another feedback signal is sent from the trigger sensor disposed within the torch 16 to the processing unit of the power source 12.

Once the trigger switch signal is processed, the power source processing unit causes power to be sent to the torch 16 to initiate a pilot arc. As will be described, the power source 12 transmits power via cable 18 to the torch 16. The HF starting circuit in the torch 16 is configured to supply a high-frequency, high-voltage power to the consumable assembly 19 of the torch 16 independent of a starting configuration of the power source 12. That is, the power source 12 delivers normal operational power to the torch 16 upon initiation and the HF starting circuit of the torch 16 provides the voltage necessary to generate the pilot arc that is required to begin the plasma cutting process. To assist in generating a pilot arc and to enable generation of a plasma for cutting, gas is supplied to the torch 16 from a pressurized gas source 39.

Figure 2:
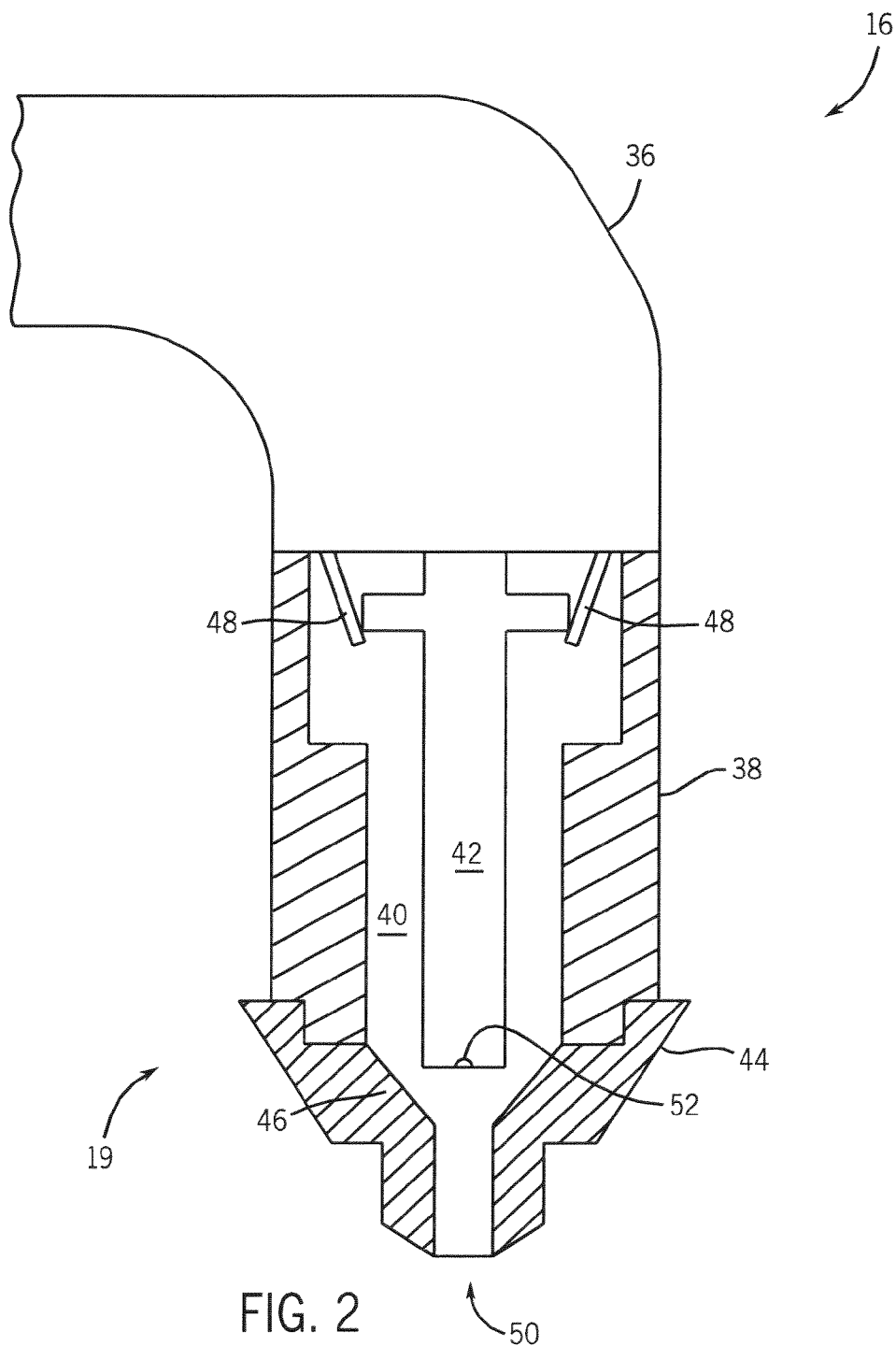
FIG. 2 is a cross-sectional view of a plasma cutting torch in accordance with the present invention.

Referring now to FIG. 2, a cross-section of a plasma cutting torch 16 is shown. Plasma torch 16 is defined by a torch body 36 that is designed to receive a shield cup 38. Shield cup 38 is connected to torch body 36 so as to define a gas chamber 40 that, as will be described in greater detail below, allows for the generation and passage of a plasma. Centrally disposed within gas chamber 40 and connected to torch body 36 is consumable or electrode 42. Consumable 42 is removably connected to torch body 36 and is specifically designed for a particular plasma cutting process. That is, torch 16 is constructed such that various consumables may be interchangeably connected depending upon the particulars of a plasma cutting process to be carried out.

Connected to shield cup 38 is tip 44 that is constructed to form a nozzle 46. In operation, gas is injected into chamber 40 via passages 48 and is heated to a plasma. The plasma is then forced out of the chamber through nozzle 46 and out of the tip 44 via opening or aperture 50. Nozzle 46 is designed to focus the velocity as well as the heat of an arc that is created between a workpiece (not shown) and electrode 42. Electrode 42 is constructed such that the arc extends across an arc path 52 out of the consumable through opening 50.

Figure 3:
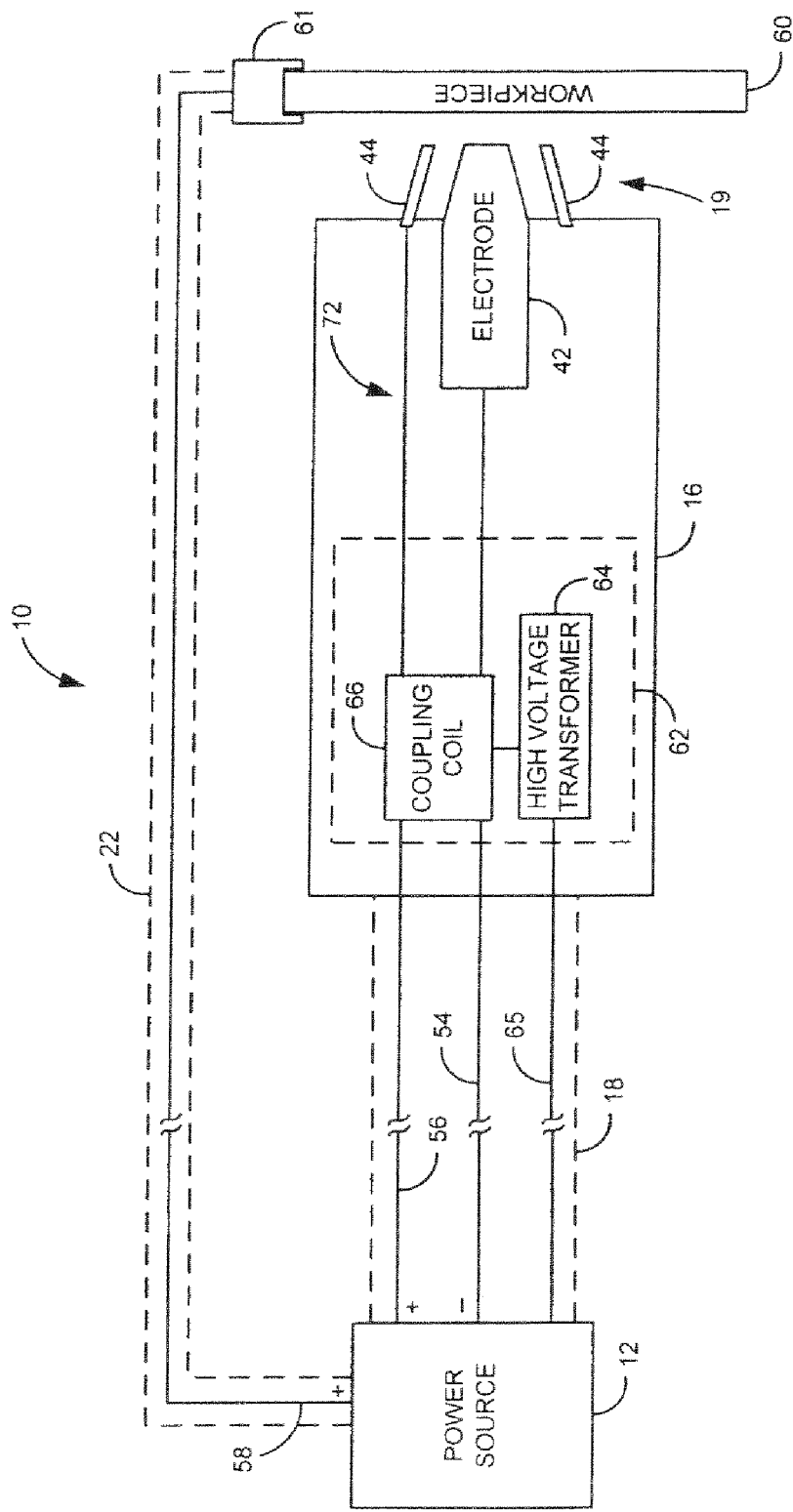
FIG. 3 is a graphic representation of a plasma cutting starting system operable with the plasma cutting system shown in FIG. 1.

Referring now to FIG. 3, a graphic representation of the plasma cutting starting system referred to in FIG. 1 is shown. The power source 12 includes three electrical connections 54–58 to the torch 16 and workpiece 60. Specifically, the workpiece 60 is connected to a first positive polarity electrical connection 58 via a clamp 61. Furthermore, a negative polarity electrical connection 54 and a second positive polarity electrical connection 56 is made via cable 18 between the power source and an HF starting circuit 62 disposed within the torch 16. A second positive polarity electrical connection is made between power source 12 and workpiece 60 via cable 22.

The negative and second positive polarity electrical connections 54, 56 are connected to a coupling coil 66, which, in turn, is electrically connected to the consumable assembly 19. Specifically, the negative polarity connection is delivered from the coupling coil 66 to a cutting electrode 42 and the positive polarity connection is delivered from the coupling coil 66 to the tip 44. Connected to the coupling coil 66 is a high voltage transformer 64. The high voltage transformer 64 is controlled by a control line 65. The control line 65 serves to cause the HF starting circuit 62 to initiate. While the control line 65 is shown for exemplary purposes as connected to the power source 12, it is also contemplated that control commands may be generated and communicated within the torch 16. As such, the control line 65 would originate within the torch 16 and terminate at the high voltage transformer 64, thereby remaining within the torch 16 and minimizing the length of the control line 65.

When a plasma cutting process is initiated, operational power is delivered from the power source 12 to the HF starting circuit 62. The HF starting circuit 62 steps the voltage up to a high-frequency, high-voltage power and delivers the power to the electrode 42. The high-frequency, high-voltage power causes a spark to fire between the electrode 42 and the tip 44 and ionizes gas within the gap between the electrode 42 and the tip 44. The ionized gas enables current to flow across the air gap between the nozzle 46 and the electrode 42. The result is a pilot arc, which is used to initiate cutting.

Placing the HF starting circuit 62 within the torch 16 has a number of advantages. Examples of some of these advantages follow. First, an electrical loop 72 created from the HF starting circuit 62 to the consumable assembly 19 and back to the HF starting circuit is a fixed distance and greatly reduced in length. That is, in systems where the HF starting circuit is disposed within the power source 12, high-frequency, high-voltage power must be transmitted via cable 18, which is typically fifty feet or greater in length. As such, a loop of over 100 feet is created from the power source 12 to the consumable assembly 19 and back. Furthermore, the exact distance of the loop may vary depending upon the length of cable 18. On the other hand, by placing the HF starting circuit 62 within the torch 16, the high voltage transformer 64 is within approximately twelve inches of the consumable assembly 19. Therefore, high-frequency, high-voltage power is transmitted a fixed distance of a matter of inches through the electrical loop 72.

As a result of the reduced and fixed distance of the electrical loop 72, losses are reduced. That is, losses are reduced due to the lowered resistance of the loop 72 as compared to the significant-in-length electrical loops of plasma cutting systems having an HF starter circuit in the power source. Furthermore, since the size of the loop 72 is fixed, the HF starting circuit 62 can be calibrated to deliver optimal power to the consumable assembly 19 rather than an overpower necessary to account for fluctuations in the loop distance. As such, electronic noise due to the transmission of the high-frequency, high-voltage power to the consumable assembly 19 is significantly reduced. The electronic noise generated by the transmission of the high-frequency, high-voltage power around the loop 72 within the torch is relatively negligible.

Furthermore, by placing the HF starting circuit 62 in the torch 16, the high voltage transformer 64 is within approximately twelve inches of the consumable assembly 19. Due to this close proximity of components, the voltage necessary to generate a pilot arc is reduced by approximately a factor of five. Accordingly, by placing the HF starting circuit 62 in the torch 16, the high voltage transformer 64 and coupling coil 66 may be reduced by approximately a factor of five. Therefore, by disposing the HF starting circuit 62 within the torch 16, a lower voltage is necessary to generate a pilot arc and, as such, the components of the HF starting circuit 62 may be reduced in size.

Also, by having the HF starting circuit within the torch 16, the torch 16 is no longer dependent upon the power source 12 for startup. As such, the torch 16 may operate with any power source regardless of the startup method that the power source was designed to perform. That is, the torch 16 can be retrofitted to power sources designed for HF or contact start plasma torches because, even at startup, the torch 16 only requires operational power from the power source 12. Therefore, the startup interdependency between the torch 16 and the power source 12 is removed and the torch 16 may be readily interchanged with various power source configurations.

It is contemplated that the above described invention be embodied in a wide variety of plasma cutting torches. Specifically, the invention is equally applicable to manually controlled cutting torches as well as robotic or computer controlled cutting torches.

It is further contemplated that the current invention be embodied in a plasma cutting torch that includes a torch body, an output electrode disposed in the torch body and a plasma cutter starting circuit disposed in the torch body and configured to generate a pilot arc at the output electrode.

It is also contemplated that the present invention be embodied as a manufacturing kit that includes a plasma cutting torch configured to operatively engage a power source and a pilot arc starting circuit configured to supply the plasma cutting torch with a pilot arc independent of a starting configuration of the power source.

Additionally, it is contemplated that the current invention be embodied in a plasma cutting assembly that includes a power source, a plasma cutting torch, and a starter circuit disposed within the plasma cutting torch, and configured to supply the plasma cutting torch with a pilot arc independent of a starting mechanism of the power source.

The present invention has been described in terms of the preferred embodiment, and it is recognized that equivalents, alternatives, and modifications, aside from those expressly stated, are possible and within the scope of the appending claims.

What is claimed is:

1. A plasma cutting torch comprising:
   a torch body;
   an output electrode disposed in the torch body; and
   a plasma cutter starting circuit disposed in the torch body and configured to generate a pilot arc signal in the torch body and deliver the pilot arc signal directly to the output electrode to cause generation of a pilot arc.

2. The plasma cutting torch of claim 1 further comprising a cutting trigger, wherein the pilot arc signal generated by the plasma cutter starting circuit is a high-frequency, high-voltage power transferred to the output electrode of the plasma cutting torch upon activation of the cutting trigger.

3. The plasma cutting torch of claim 1 wherein output electrode of the plasma cutting torch is configured to receive high-frequency power to cause generation of the pilot arc across an airgap to a workpiece.

4. The plasma cutting torch of claim 1 wherein the torch body includes a handle and wherein the plasma cutter starting circuit is disposed within the handle and includes a coupling coil and high voltage transformer.

5. The plasma cutting torch of claim 1 wherein the plasma cutter starting circuit is configured to supply a high-frequency, high-voltage power to the output electrode independent of a starting configuration of a plasma cutter power source to which the torch is connected.

6. The plasma cutting torch of claim 5 wherein a distance between the output electrode and the plasma cutter starter circuit is less than 12 inches.

7. The plasma cutting torch of claim 1 wherein the plasma cutter starting circuit is disposed within a manually controlled plasma cutting torch.

8. The plasma cutting torch of claim 1 wherein the starting circuit is further configured such that noise radiation from the plasma cutter starting circuit is negligible.

9. The plasma cutting torch of claim 1 wherein the plasma cutting torch is operable with a power source configured for a contact start plasma cutter.

10. The plasma cutting torch of claim 1 wherein the plasma cutter starting circuit is disposed within a robotic plasma cutting torch.

11. The plasma cutting torch of claim 1 wherein the starting circuit is further configured to generate the pilot arc at the output electrode to ionize gas and initiate generation of a plasma.

12. A manufacturing kit comprising:
a plasma cutting torch having an anode and a cathode and configured to operatively engage a power source; and
a pilot arc starting circuit positioned in the plasma cutting torch and configured to supply the plasma cutting torch with a pilot arc voltage produced by the pilot arc starting circuit in the plasma cutting torch and necessary to generate a pilot arc between the anode and the cathode of the plasma cutting torch.

13. The manufacturing kit of claim 12 wherein the pilot arc voltage is generated independent of a starting configuration of the power source.

14. The manufacturing kit of claim 13 wherein the starting configuration of the power source is a contact start starting configuration.

15. The manufacturing kit of claim 12 wherein at least one of the anode and cathode further comprise an output electrode and wherein the pilot arc starting circuit is configured to supply a high-frequency, high-voltage, low-current power to the output electrode to initiate plasma cutting.

16. A plasma cutting assembly comprising:
a plasma cutting torch;
a power source providing at least operational power to the plasma cutting torch; and
a starter circuit disposed within the plasma cutting torch and configured to receive the operational power from the power source and step up voltage of the operational power to a high-frequency, high voltage power within the plasma cutting torch to cause a pilot arc in the plasma cutting torch.

17. The plasma cutting assembly of claim 16 wherein the power source is configured for a contact start plasma cutter.

18. The plasma cutting assembly of claim 16 wherein the starter circuit is configured to supply a high-frequency, high-voltage, low-current power to generate the pilot arc.

19. The plasma cutting assembly of claim 16 wherein the starter circuit is disposed within a handle of the plasma cutting torch.

20. The plasma cutting assembly of claim 16 having an open circuit output voltage of greater than 230 Volts Direct Current.

* * * * *